(12) United States Patent
Hartland

(10) Patent No.: US 11,442,191 B2
(45) Date of Patent: Sep. 13, 2022

(54) SYSTEM AND METHOD FOR DEPLOYING OCEAN BOTTOM SEISMIC NODES USING A PLURALITY OF UNDERWATER VEHICLES

(71) Applicants: Martin John Hartland, Katy, TX (US); Seabed Geosolutions B.V., Leidschendam (NL)

(72) Inventor: Martin John Hartland, Katy, TX (US)

(73) Assignee: Seabed Geosolutions B.V., Leidschendam (NL)

( * ) Notice: Subject to any disclaimer, the term of this patent is extended or adjusted under 35 U.S.C. 154(b) by 114 days.

(21) Appl. No.: 16/487,765

(22) PCT Filed: Apr. 19, 2018

(86) PCT No.: PCT/US2018/028342
§ 371 (c)(1),
(2) Date: Aug. 21, 2019

(87) PCT Pub. No.: WO2018/204084
PCT Pub. Date: Nov. 8, 2018

(65) Prior Publication Data
US 2020/0049849 A1    Feb. 13, 2020

Related U.S. Application Data

(60) Provisional application No. 62/500,318, filed on May 2, 2017.

(51) Int. Cl.
*G01V 1/38* (2006.01)
*B63B 21/66* (2006.01)
*B63G 8/00* (2006.01)

(52) U.S. Cl.
CPC ............ *G01V 1/3852* (2013.01); *B63B 21/66* (2013.01); *B63G 8/001* (2013.01); *B63G 2008/007* (2013.01)

(58) Field of Classification Search
CPC ...... G01V 1/3852; B63B 21/66; B63G 8/001; B63G 2008/007
See application file for complete search history.

(56) References Cited

U.S. PATENT DOCUMENTS 6,260,504 B1    7/2001  Moles et al.
6,975,560 B2   12/2005  Berg et al.
(Continued)

FOREIGN PATENT DOCUMENTS

WO    2012129612 A1    10/2012

OTHER PUBLICATIONS

IMCA; "Code of Practice for The Safe & Efficient Operation of Remotely Operated Vehicles", published Mar. 20, 2014, IMCA R004 Rev 3.
(Continued)

*Primary Examiner* — Ian J Lobo
(74) *Attorney, Agent, or Firm* — Park, Vaughan, Fleming & Dowler LLP; Shane Nelson

(57) ABSTRACT

Embodiments, including systems and methods, for deploying ocean bottom seismic nodes. Two or more underwater vehicles (such as remotely operated vehicles (ROVs)) may be deployed by a surface vessel and each connected to the surface vessel by a ROV deployment line. A catenary shape of each ROV deployment line may be modeled for more accurate and efficient subsea ROV operations. Real-time modeling and predictive modeling of the catenary shape of the deployed lines may be performed, and the surface vessel and/or ROVs may be positioned based on the modeled catenary shapes. The ROVs may be automatically positioned and/or controlled based on commands from a dynamic positioning (DP) system. An integrated navigation system (INS) may be located on the surface vessel and directly coupled to the one or more DP systems. The surface
(Continued)

vessel may travel backwards during deployment operations and deploy one or more subsea baskets astern from the ROVs.

7 Claims, 6 Drawing Sheets

(56) References Cited

U.S. PATENT DOCUMENTS

| | | | |
|---|---|---|---|
| 7,210,556 | B2 | 5/2007 | Bath et al. |
| 7,324,406 | B2 | 1/2008 | Berg |
| 7,632,043 | B2 | 12/2009 | Thompson et al. |
| 7,675,821 | B2 | 3/2010 | Berg et al. |
| 8,075,226 | B2 | 12/2011 | Thompson et al. |
| 8,310,899 | B2 | 11/2012 | Woodard, Jr. et al. |
| 8,611,181 | B2 | 12/2013 | Woodward, Jr. et al. |
| 9,090,319 | B2 | 7/2015 | Brizard et al. |
| 9,415,848 | B2 | 8/2016 | Jewell |
| 9,505,473 | B2 | 11/2016 | Kerins et al. |
| 9,523,780 | B2 | 12/2016 | Naes et al. |
| 9,873,496 | B2 | 1/2018 | Rokkan et al. |
| 2006/0159524 | A1 | 7/2006 | Thompson et al. |
| 2008/0300821 | A1 | 12/2008 | Frank et al. |
| 2009/0052992 | A1 | 2/2009 | Thompson et al. |
| 2011/0286302 | A1* | 11/2011 | Welker ............... G01V 1/3826 367/16 |
| 2012/0129612 | A1 | 5/2012 | Saito et al. |
| 2015/0284060 | A1 | 10/2015 | Jewell et al. |
| 2015/0316675 | A1 | 11/2015 | Brizard et al. |
| 2016/0046358 | A1 | 2/2016 | Lelaurin et al. |
| 2016/0121983 | A1 | 5/2016 | Rokkan et al. |
| 2016/0124105 | A1 | 5/2016 | Valsvik et al. |

OTHER PUBLICATIONS

PCT/US2018/028342 International Search Report and the Written Opinion of the International Search Authority, European Patent Office, dated Oct. 17, 2018.
U.S. Appl. No. 15/836,734, filed Dec. 8, 2017, Inventor Brendan James Reid.
U.S. Appl. No. 15/903,607, filed Feb. 23, 2018, Inventor Martin John Hartland.
Ewen et al.; "Work Class ROVs for Operations in 4000 Meters of Water Depth: Prestige Wreck Fuel Recovery Project", 2005 Offshore Technology Conference held in Houston, TX May 2-5, 2005.
Singh et al.; "Survey Operations in Ultra-Deep Waters", Offshore Mediterranean Conference and Exhibition in Ravenna, Italy Mar. 28-30, 2001.

* cited by examiner

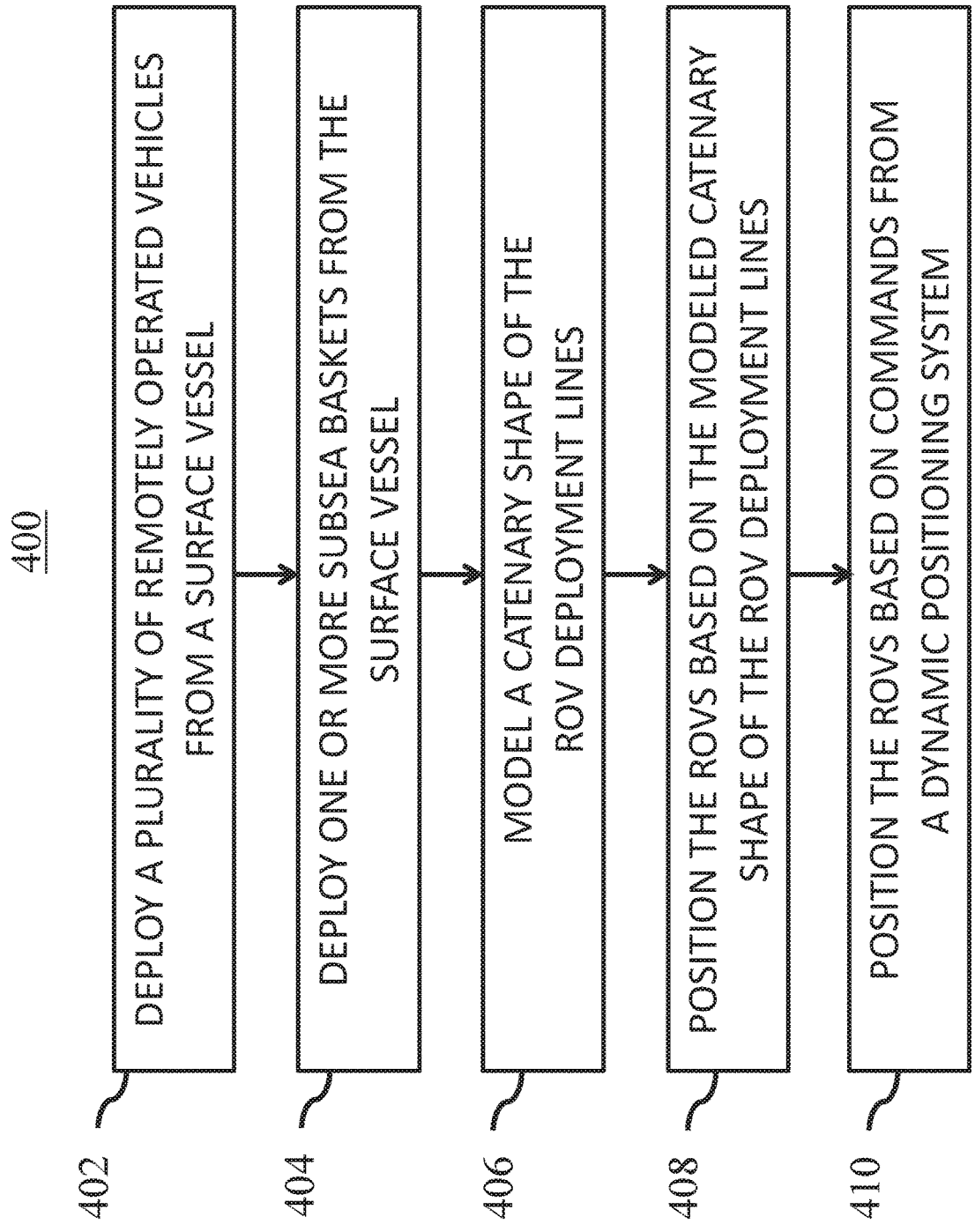

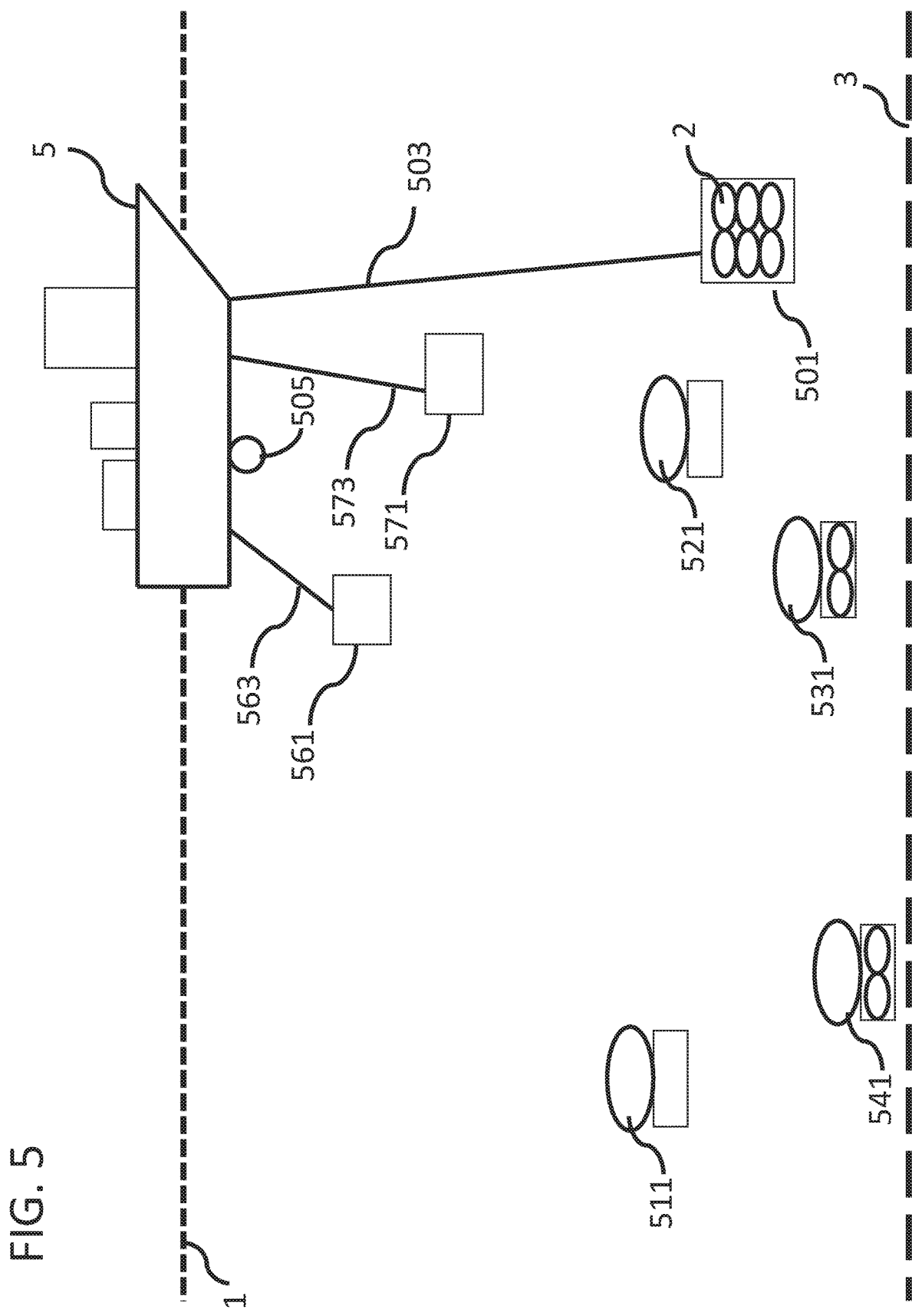

SYSTEM AND METHOD FOR DEPLOYING OCEAN BOTTOM SEISMIC NODES USING A PLURALITY OF UNDERWATER VEHICLES

PRIORITY

This application claims priority to U.S. provisional patent application No. 62/500,318, filed on May 2, 2017, the entire content of which is incorporated herein by reference.

BACKGROUND OF THE INVENTION

Field of the Invention

This invention relates to the management of a plurality of remotely operated vehicles or other unmanned underwater vehicles, and more particularly to the deployment of autonomous ocean bottom seismic nodes using the plurality of unmanned underwater vehicles.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name MANTA®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel and positioned on or near the seabed.

Autonomous ocean bottom nodes are independent seismometers, and in a typical application they may be self-contained units comprising a housing, frame, skeleton, or shell that includes various internal components such as one or more seismic sensors (e.g., geophone and hydrophone sensors), a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. See, e.g., U.S. Pat. No. 9,523,780 (citing patents and publications), incorporated herein by reference. Still further, the autonomous seismic nodes may be integrated with an AUV such that the AUV, at some point subsea, may either travel to or from the seabed at a predetermined position. See, e.g., U.S. Pat. No. 9,090,319, incorporated herein by reference. In general, the basic structure and operation of an autonomous seismic node and a seismic AUV is well known to those of ordinary skill.

A general seismic deployment and survey operation generally requires one or more surface vessels that deploy and/or retrieve autonomous seismic nodes from the ocean bottom. See, e.g., U.S. Pat. No. 9,090,319, incorporated herein by reference. Generally, a deployment vessel stores a plurality of autonomous seismic nodes, and one method of deployment utilizes a ROV as well as a separate basket to hold some of the seismic nodes, each which is lowered to a subsea position and connected to a surface vessel by a deployment line, such as an umbilical, tether, and/or wire. As is known in the art, one or even two ROVs may be used to deploy nodes to the ocean bottom. See, e.g., U.S. Pat. Nos. 6,975,560; 7,210,556; and 8,611,181, incorporated herein by reference. One conventional method is to deploy a ROV in a body of water while also deploying a separate underwater node transfer device, such as a cage or basket or skid, that is configured to hold a plurality of autonomous seismic nodes and be lowered and raised from a surface vessel. At a certain subsea position, the ROV docks or mates with the node transfer device and transfers one or more nodes from the node transfer device to the ROV. The ROV then places the retrieved nodes at one or more positions on the seabed. Prior art patents and publications illustrating this method include at least the following: U.S. Pat. Nos. 6,975,560; 7,210,556; 7,324,406; 7,632,043; 8,310,899; 8,611,181; 9,415,848; 9,873,496, and U.S. Patent Application Publication Nos. 2006/0159524 and 2015/0284060, each of which is incorporated herein by reference.

However, the use of more than two ROVs for the deployment of seismic nodes is not possible and/or practical based on current technologies, as each additional ROV exponentially increases the complexity of the operation. For example, with conventional technologies, for each ROV used approximately 6-10 operators are needed on the vessel to manage the operations of the ROV. A large number of ROVs (such as 4 or 6 ROVs) currently requires a large number of operators on the vessel, much more than a standard surface vessel would allow. Further, each ROV is connected to the surface vessel with a deployment line that has a catenary shape in the water; that is, each line has a curve (such as a U-shaped curve) in the water connecting the ROV to the surface vessel. The catenary shape may have many different shapes based on a variety of different factors, including the type of subsea equipment deployed, water conditions, wave currents, cable tension, speed of vessel, speed of subsea equipment, etc. The catenary shape of the deployed line provides numerous operational constraints for the deployment system. For example, the deployment lines from separate equipment do not need to cross or touch each other, so knowledge of their relative position is necessary.

This is particularly important with a large number of ROVs working in the same subsea area. Further, prior art systems require a ROV operator to physically steer an ROV during subsea operations as opposed to automatically controlling such operations from a remote Dynamic Positioning (DP) system. Still further, conventional ROV tether control is a manual operation with the ROV pilot observing winch load and tether shape by a camera, which is inefficient and not practically possible for a large number of operating ROVs. While automation of ROV operations is desirable, current ROV systems do not allow for a high degree of automation.

With today's need for increased speed and efficiency for subsea operations, handling and operating a large number of ROVs at the same time using conventional technologies is simply not feasible. A need exists for an improved method and system for deploying seismic nodes on the seabed, particularly with a large number of ROVs. This need exists not only in ocean bottom seismology when using ROVs but also in any other offshore context when using a large number of ROVs or other underwater vehicles.

SUMMARY OF THE INVENTION

Embodiments, including systems and methods, for deploying ocean bottom seismic nodes. Two or more underwater vehicles (such as remotely operated vehicles (ROVs)) may be deployed by a surface vessel and each connected to the surface vessel by a ROV deployment line. A catenary shape of each ROV deployment line may be modeled for more accurate and efficient subsea ROV operations. Real-time modeling and predictive modeling of the catenary shape of the deployed lines may be performed, and the surface vessel and/or ROVs may be positioned based on the modeled catenary shapes. The ROVs may be automatically positioned and/or controlled based on commands from a dynamic positioning (DP) system. An integrated navigation system (INS) may be located on the surface vessel and directly coupled to the one or more DP systems. The surface vessel may travel backwards during deployment operations and deploy one or more subsea baskets astern from the ROVs.

In one embodiment, disclosed is a method for the deployment of ocean bottom seismic nodes to the seabed. The method may comprise deploying a plurality of remotely operated vehicles (ROVs) from a surface vessel, wherein each of the ROVs is connected to the surface vessel by a ROV deployment line. The plurality of ROVs may comprises three or more ROVs, such as four or six ROVs. The ROVs may be tethered or untethered. Other unmanned vessels may also be used besides ROVs. The method may further comprise deploying a plurality of ocean bottom seismic nodes on the seabed by the plurality of ROVs, modeling a catenary shape of each ROV deployment line during the deployment of the ocean bottom seismic nodes, and automatically positioning the plurality of ROVs during the deployment of the ocean bottom seismic nodes by one or more Dynamic Positioning (DP) systems.

The method may further comprise determining one or more operating parameters for the surface vessel based on the modeled catenary shape of the ROV deployment lines and/or determining one or more operating parameters for each of the plurality of ROVs based on the modeled catenary shape of the ROV deployment lines. The modeled catenary shapes may be actual or predictive. The method may further comprise outputting the modeled catenary shape of the ROV deployment lines to an Integrated Navigation System (INS) on the surface vessel for real-time visualization of the ROV deployment lines. The method may further comprise determining a position of each of the ROVs by a surface vessel Integrated Navigation System (INS) and outputting that ROV position to the one or more DP systems.

The surface vessel may travel substantially backwards during the deployment of the ROVs and seismic nodes. For example, the method may further comprise deploying the plurality of ROVs from the surface vessel while the surface vessel is travelling backwards. The speed of the surface vessel may be approximately 2 knots during the overall deployment operation.

The method may further comprise utilizing one or more subsea baskets from the same or different surface vessel. The subsea baskets may be configured to hold a seismic payload, such as the plurality of ocean bottom seismic nodes. The method may further comprise deploying a subsea basket holding the plurality of ocean bottom seismic nodes from the surface vessel and automatically docking each of the plurality of ROVs to the subsea basket based on commands provided by the one or more DP systems. In some embodiments, the subsea basket may be deployed astern to the deployment of the plurality of ROVs from the surface vessel.

In one embodiment disclosed is a system for the deployment of ocean bottom seismic nodes. The system may comprise a plurality of remotely operated vehicles (ROVs) each connected to a surface vessel via a ROV deployment line, a subsea basket configured to hold a plurality of ocean bottom seismic nodes and dock with each of the plurality of ROVs, a catenary modeling system on the surface vessel configured to model the shape of each ROV deployment line, one or more dynamic positioning (DP) systems coupled to each of the plurality of ROVs, and an integrated navigation system (INS) located on the surface vessel and directly coupled to the one or more DP systems.

In one embodiment, the INS may be configured to output a ROV target position and the ROV current position to the one or more DP systems. The one or more DP systems may be configured to automatically position each of the plurality of ROVs from a first subsea position to a second subsea position based on data provided by the INS. In some embodiments, the one or more DP systems is configured to automatically position each of the plurality of ROVs without an operator physically steering the ROV. Some of the ROVs may be tethered or untethered. In one embodiment, at least one of the plurality of ROVs is an untethered ROV, wherein the deployment line for the untethered ROV comprises an umbilical cable from a subsea docking station to the surface vessel.

Also disclosed is a deck configuration on the back deck of a marine vessel for the deployment of ocean bottom seismic nodes. In one embodiment, the deck may comprise a first plurality of ROV deployment systems located substantially on a first side of a surface vessel, a second plurality of ROV deployment systems located substantially on a second side of the surface vessel, and a first LARS basket system located on the surface vessel astern from the first and second plurality of ROV deployment systems. The deck configuration may further comprise a wavegate located substantially near the aft of the surface vessel. In one embodiment, the first and second plurality of ROV deployment systems each comprises at least two ROV deployment systems (for a total of at least four ROV deployment systems). In one embodiment, a second LARS basket system may be located on an opposite side of the surface vessel relative to the first LARS basket system and located astern from the first and second plurality of ROV deployment systems.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4 illustrates one embodiment of a method for deploying a plurality of ROVs for a seabed seismic deployment operation.

FIG. 5 illustrates one embodiment of a subsea seismic deployment operation using untethered UUVs.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

System and Operation

Figure 1:
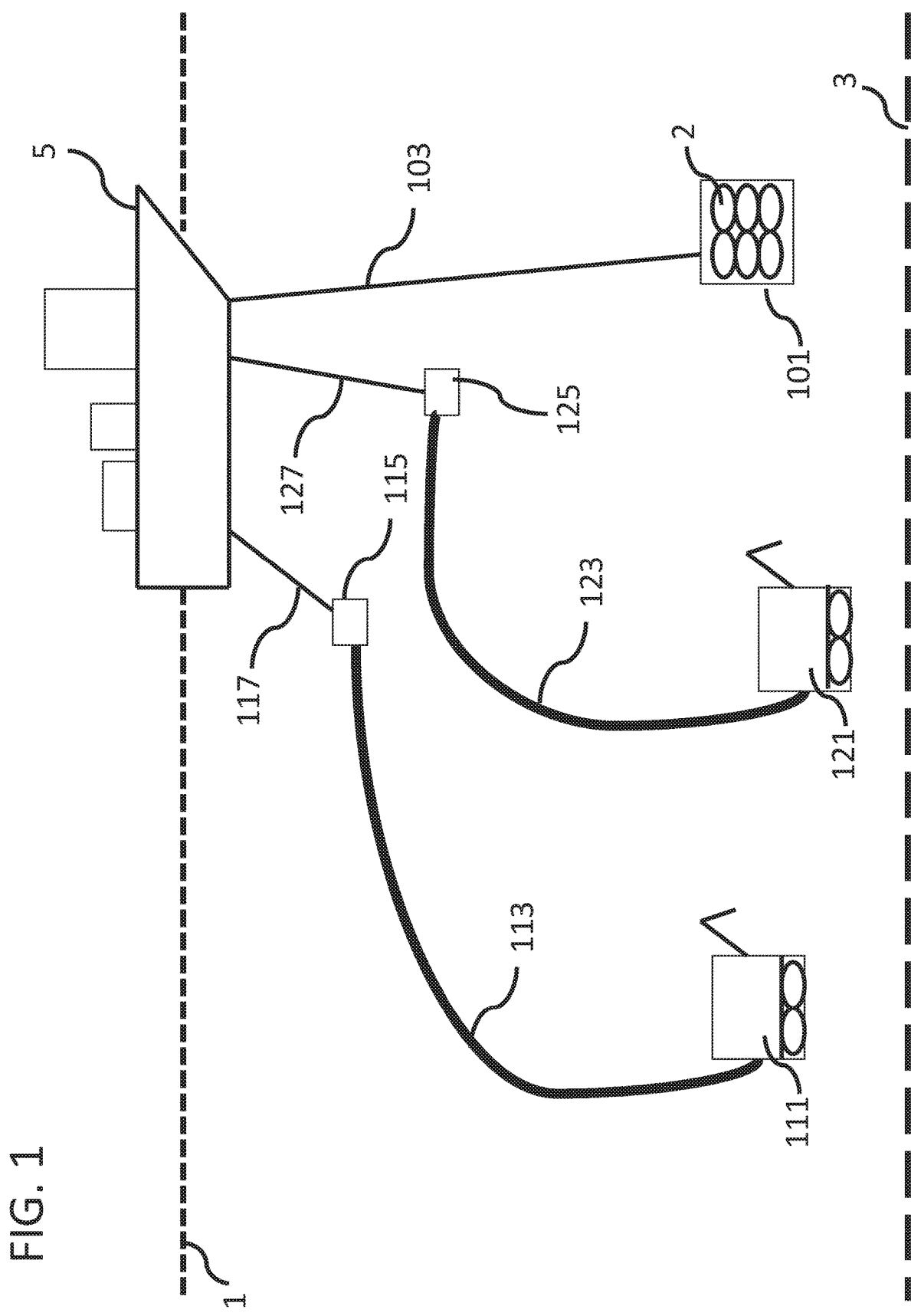
FIG. 1 illustrates one embodiment of a subsea seismic deployment operation using tethered ROVs.

FIG. 1 shows one example of a subsea deployment operation for a plurality of seismic nodes. In one embodiment, surface vessel 5 is located on water surface 1 and is configured to deploy a plurality of ROVs from the surface vessel, such as two, three, four, five, or six or more ROVs. For simplicity purposes, FIG. 1 only shows two ROVs deployed from the vessel, although many more ROVs are possible based on this disclosure. For example, one embodiment deploys six ROVs from a single vessel and continuously/simultaneously operates those six ROVs for the deployment of autonomous seismic nodes to the seabed. Another embodiment utilizes four ROVs, while another embodiment utilizes eight ROVs.

The present disclosure simultaneously operates a large number of ROVs based on the use of and/or interaction of a number of separate innovations, including real time catenary modeling of the deployment line of each ROV, the integration between the surface vessel's Integrated Navigation Systems (INS) and each ROV's Dynamic Positioning (DP) system, the ability for the surface vessel to travel backwards, and automated ROV operations, such as automated docking of the ROV to the subsea basket and automated ROV positioning from a first subsea position to a second subsea position without requiring an operator to physically steer the ROV. In operation, the surface vessel may travel forwards or backwards during the deployment and/or operation of the ROVs. In one embodiment, however, the surface vessel travels backwards for better control of the surface vessel.

The present disclosure allows a surface vessel to operate a higher number of working ROVs (WROVs) from the traditional number of one or two per vessel simultaneously without risk of wire/line clashing and the tangling of subsea elements. In one embodiment, the surface vessel operating speed may travel approximately up to 2 knots as a function of water depth while simultaneously deploying six ROVs, with a node receiver line spacing of approximately 200 meters. For example, at 1500 meters of water depth the surface vessel may travel at approximately 2 knots, but may travel faster at shallower depths and slower at deeper depths of up to 3000 meters (or more). The present disclosure allows the crew size to be safely reduced from current IMCA (International Marine Contractors Association) guidance of approximately 6 men per WROV to 4 or less men per WROV. This significantly decreases the cost to operate the ROVs and increases the efficiency of each ROV and the overall node deployment operation.

Referring to FIG. 1, surface vessel 5 deploys first ROV 111, second ROV 121, and other ROVs (not shown) into a body of water. In one embodiment, each ROV may be the FUGRO FCV3000, but other similar ROVs can be used as well. In general, the structure and operation of marine ROVs are well known to those of ordinary skill. For example, U.S. Publication No. 2015/0316675, incorporated herein by reference, describes a ROV configured to deploy and retrieve autonomous seismic nodes to the seabed with a separate AUV configured to monitor and exchange data with the seismic nodes. Likewise, U.S. Pat. No. 8,075,226, incorporated herein by reference, describes a ROV configured to physically deploy autonomous seismic nodes from a carrier located on the ROV as well as a basket lowered by a surface vessel and to mechanically connect the ROV to the lowered basket to transfer nodes from the basket to the ROV carrier. In other embodiments, an autonomous underwater vehicle (AUV) or other unmanned underwater vehicle (UUV) may be used instead of an ROV Likewise, the structure and operation of an AUV is well known to those of ordinary skill. For example, Applicant's U.S. Pat. No. 9,090,319, incorporated herein by reference, discloses one type of autonomous underwater vehicle for marine seismic surveys. Applicant's U.S. Pat. No. 9,873,496, incorporated herein by reference, discusses the general components and configurations of ROVs and seismic AUVs, incorporated herein by reference. Of course, one of skill in the art realizes that the AUV or UUV (or ROV) for deploying seismic nodes to the seabed need not have any seismic sensors itself. While various ROVs, UUVs, or AUVs may be used with the embodiments presented in this disclosure, the invention is not limited to any particular underwater vehicle or configuration thereof to deploy the autonomous seismic nodes on the seabed.

Surface vessel 5 deploys subsea basket 101 to a position on or near the seabed or at some position subsea between the surface vessel and the seabed. In some embodiments, two or more subsea baskets may be deployed from the vessel. Subsea basket 101 may be located near the surface, at a subsea position between the seabed and the surface, near the seabed, or on the seabed. In one embodiment, the ROV and/or subsea basket may be moving in the body of water with a first speed based on movement of the ROV, movement of the vessel, or current movement.

As is known in the art, first ROV 111 is coupled to first TMS 115 via tether 113 and second ROV 121 is coupled to second TMS 125 via tether 123, with first TMS 115 being coupled to surface vessel 5 via first umbilical cable 117 and second TMS 125 being coupled to surface vessel 5 via second umbilical cable 127. Additional ROVs are similarly coupled to the surface vessel, each with a corresponding tether, TMS, and umbilical cable/line. In general, for the purposes of this disclosure, some or all of the portions of an ROV's tether and/or umbilical cable may be generally considered as the ROV's deployment line. As is known in the art, the tether management system (TMS) is coupled to the ROV during lowering and/or raising of the ROV through the splash zone from the surface vessel. The TMS has a tether winch that may length and/or shorten the tether as appropriate. The umbilical cable provides power and data signals between the surface vessel and the TMS. The TMS relays data signals and/or power for the ROV through the tether line. In some embodiments, untethered ROVs or UUVs may be used, discussed in more detail in relation in FIG. 5.

Basket 101 may be lowered from surface vessel 5 via wire/cable 103 with a plurality of autonomous seismic nodes 2 (or other seismic payload devices) stored in the basket for transfer with the ROV(s), such as disclosed in U.S. Pat. Nos. 6,975,560 and 9,873,496, each incorporated herein by reference. Each ROV may be used to transfer seismic nodes 2 from basket 101 and deploy those seismic nodes to seabed 3 at predetermined positions. In one embodiment as shown in FIG. 1, the ROV may have a skid or other node storage system for storing a plurality of autonomous seismic nodes on the ROV as is known in the art. Node storage system may be located on an underside of the ROV or may be located on a front, back, or side portion of the ROV. In the embodiment shown in FIG. 1, each of the ROVs has a plurality of nodes stored on a skid coupled to the ROV. In some embodiments, the nodes may be stored and/or handled by a plurality of grabbers, grippers, manipulators, or other single node handling devices, as described herein. For example, each ROV may hold a plurality of autonomous seismic nodes by any number of mechanisms, such as a robotic arm manipulator, a cage, basket, conveyor, or skid, as described in U.S. Pat. Nos. 6,975,560, 7,210,556, and 8,611,181, and U.S. Patent Publication No. 2006/0159524, each incorporated herein by reference. Likewise, the ROVs may dock with and/or couple to the basket by a wide variety of mechanisms, such as by one or more docking probes as described in U.S. Pat. Nos. 6,975,560 and 9,415,848 and U.S. patent application Ser. Nos. 15/836,734 and 15/903,607, each incorporated herein by reference. Thus, in one embodiment, the ROV may have a docking system used to dock and/or mate with subsea basket 101, which may or may not have a corresponding collar or docking mechanism to mate with the docking system of the ROV. In one embodiment, the ROVs and subsea basket 101 each comprise acoustic modems that are configured to communicate with each other or the surface vessel via acoustic communications. The present disclosure is not limited to any particular node holding device or node transfer device or basket coupling device. In other words, the nodes may be transferred to and from the baskets and the ROVs (and/or from the baskets to the seabed) in any number of configurations. In other embodiments, an autonomous underwater vehicle (AUV) or other unmanned underwater vehicle (UUV) may be used instead of an ROV.

In one embodiment, each ROV and TMS is coupled with a beacon or transponder so that the surface vessel knows the position of each ROV and TMS. Likewise, subsea basket 101 may be equipped with a transponder or beacon such that its position may also be known. Because the surface vessel's position is known, the surface vessel knows at least the beginning position and the end position of each deployment line. For the purposes of this disclosure, the deployment line of an ROV may be considered (i) the tether portion from the ROV to the TMS, (ii) the umbilical portion from the TMS to the surface vessel, or (iii) the entire cable portion from the ROV to the surface vessel (which may itself be formed of multiple cables/lines, such as a tether portion and an umbilical cable portion). Various sensors, devices, inputs, etc. may be coupled to an Integrated Navigation System (INS) on the surface vessel or a Dynamic Positioning (DP) system for the ROV on the surface vessel or the ROV itself. In one embodiment, the length of the deployment line (whether from the TMS to the surface vessel or from the ROV to the TMS) is known. In one embodiment, the length of the tether line may be approximately 1200 meters, which increases the layback of the TMS and increases subsea separation of the ROVs. The surface vessel speed, heading, range, bearing may also be known. The current profile may also be known (whether based on measured profiles or estimates). The tension of each deployment line may be measured or predicted. In some embodiments, real time sensors utilized may include but not be limited to USBL beacon positions, vessel gyroscopes, ROV gyroscopes, Doppler velocity logs (DVL), current profilers, echo sounders, and motion reference units (MRUs). In still other embodiments, the pre-survey data and/or seabed profile may be inputted into the DP system, INS, and/or modeling software for a better predictive analysis of different subsea parameters, including a catenary shape of the deployment lines.

Figure 3:
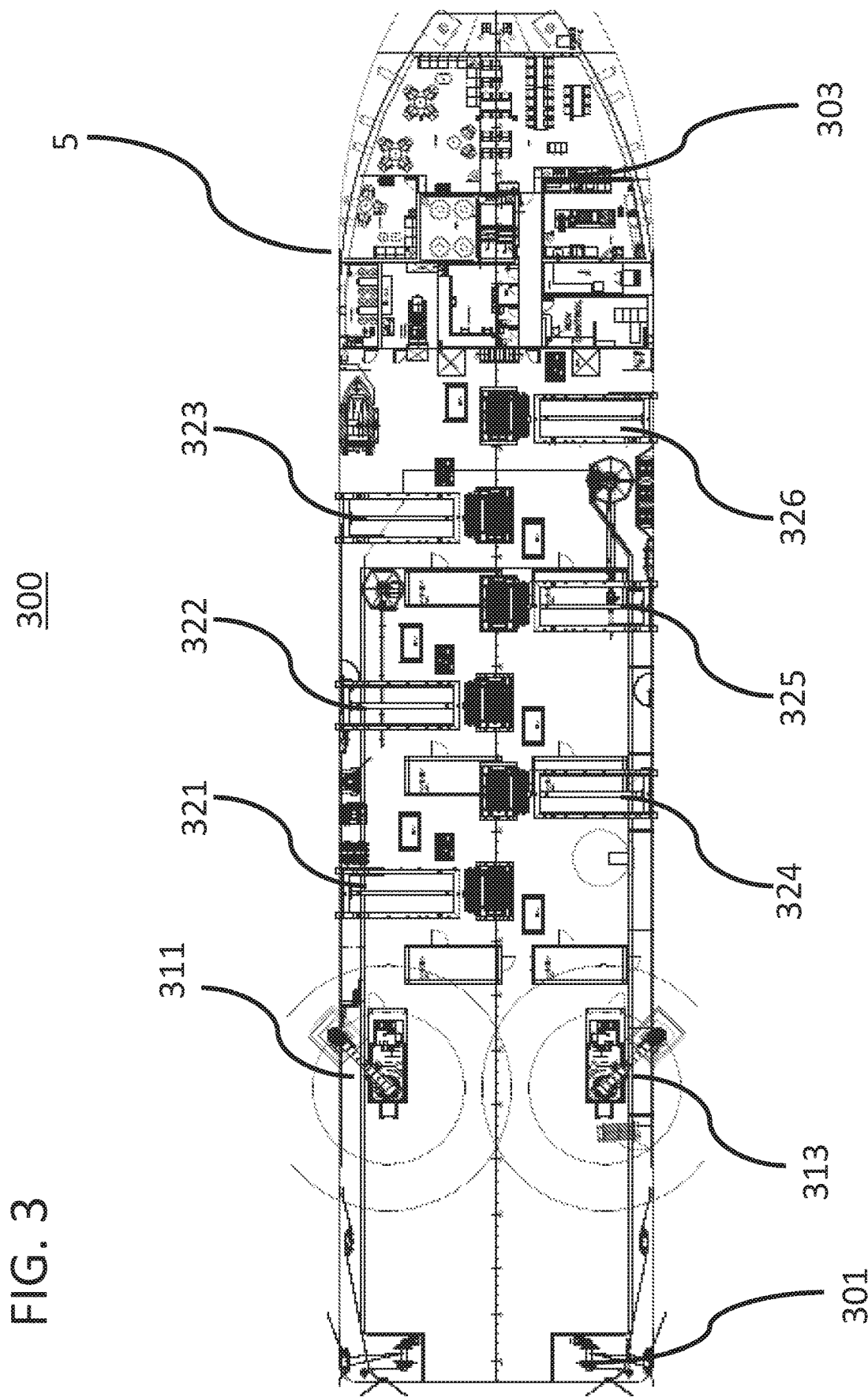
FIG. 3 illustrates a top view schematic of one embodiment of a back deck of a marine surface vessel.

In one embodiment, three ROVs are deployed from the left and right side of the surface vessel (see FIG. 3). A basket may be deployed from each of (or either) the left, right, or back sides of the surface vessel. In one embodiment, to reduce the risk of entanglement, the ROVs are operated in an "out of phase" operation so that not all of the WROVs are positioned at the subsea basket at the same time for the replenishment of nodes. For example, one (or more) of the ROVs may be deploying a seismic node at the intended seabed destination, one (or more) of the ROVs may be travelling to the intended seabed destination, one (or more) of the ROVs may be travelling from the seabed destination, and one (or more) of the ROVs may be located approximate to the subsea basket for node transfer. This staggered or "out of phase" operation maximizes the efficiency of the ROVs while also decreasing the chance of entanglement between the ROVs. Further, the ROV may travel to the basket by following the tether/deployment line back to the TMS and then flying to the basket, which also reduces the risk of line entanglement. In one embodiment, the ROV approaches and docks to the basket via the astern direction of the ROV.

In some embodiments, some or all of the ROV tasks (such as docking with a subsea device, loading/unloading subsea payloads, planting and picking up seismic nodes from the seabed, etc.) can be automated for increased efficiencies. The automation of such tasks is highly desirable, as it increases the efficiency of the particular and overall ROV operations and decreases operating costs. In particular, automation decreases manpower requirements, decreases the time needed for a particular event, increases repetition success rate, and increases the operational capabilities of particular tasks that require calculations of multiple factors. However, current ROV systems do not allow for a high degree of automation. For example, docking a ROV to a subsea device is typically performed manually, and flying an ROV from a first subsea position to a second subsea position is also performed manually by an ROV operator. The present disclosure allows different ROV tasks to be performed automatically. For example, as described later, the integrated surface vessel INS and ROV DP system allows for automation of ROV subsea flight movements without needing the ROV operator to physically steer the ROV.

Figure 2A:
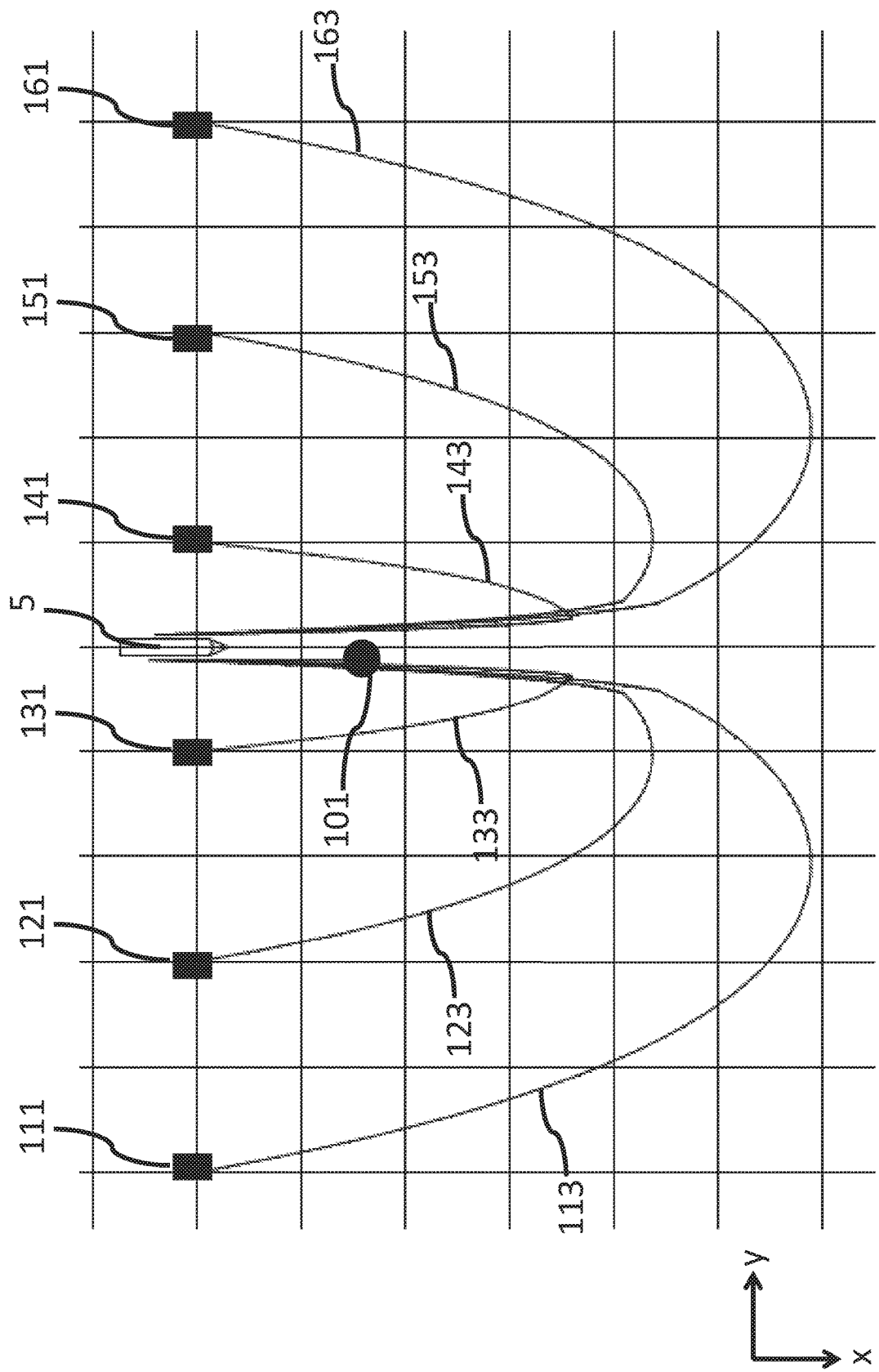
FIGS. 2A-2C illustrate various views of one embodiment of a subsea seismic deployment operation.
Figure 2B:
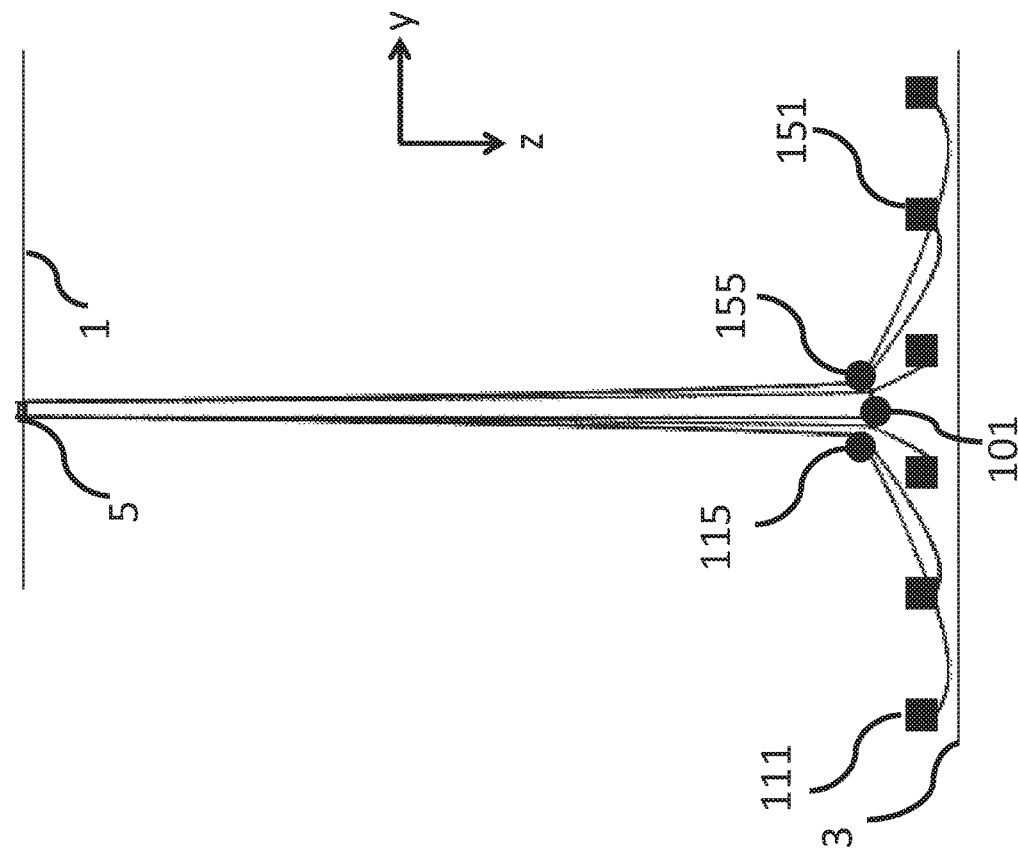
Figure 2C:
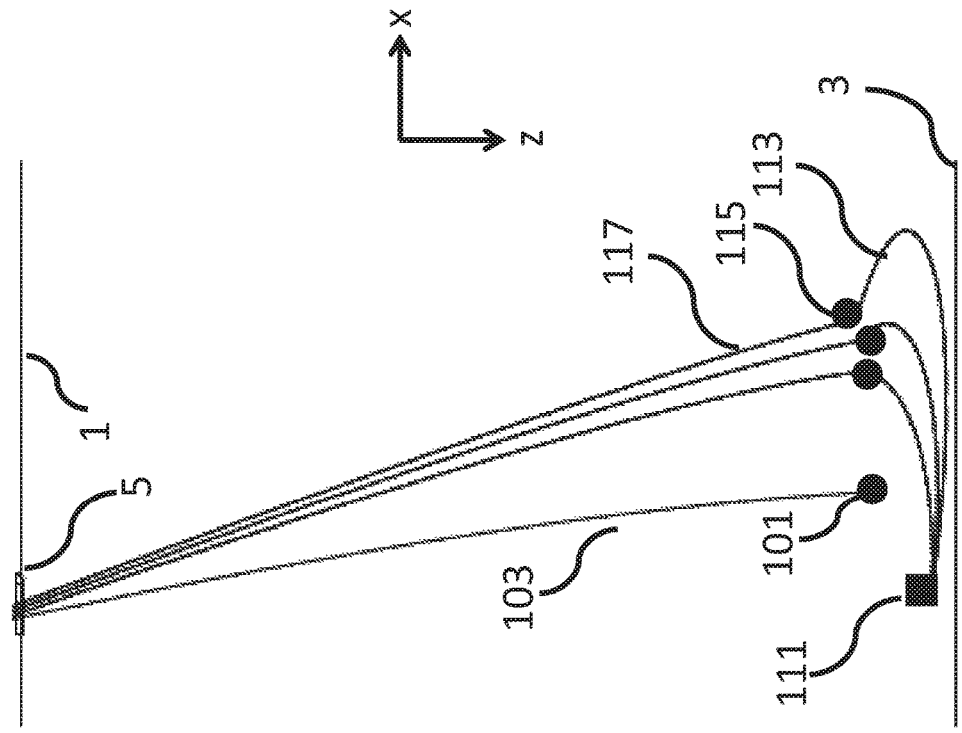

FIGS. 2A-2C illustrate various views of one embodiment of a subsea seismic deployment operation, and in particular the position of various subsea equipment and the catenary shape of the deployment lines connecting the subsea equipment to a surface vessel. FIG. 2A shows a subsea deployment system from a top or aerial perspective, FIG. 2B shows the subsea system from FIG. 2A from a subsea side perspective, and FIG. 2C shows the subsea system from FIG. 2A from a subsea rear perspective. The subsea seismic deployment system shown in FIGS. 2A-2C may be substantially similar to the system shown in FIG. 1 and may include three or more ROVs each coupled to a surface vessel 5 with a deployment line. As shown in FIGS. 2A-2C, the tether portion of the deployment line has increased drag and/or shape as opposed to the umbilical portion of the deployment line (which is generally not separately labeled for simplicity purposes). For example, first ROV 111 may be coupled to surface vessel 5 via deployment line 113, second ROV 121 may be coupled to surface vessel 5 via deployment line 123, third ROV 131 may be coupled to surface vessel 5 via deployment line 133, fourth ROV 141 may be coupled to surface vessel 5 via deployment line 143, fifth ROV 151 may be coupled to surface vessel 5 via deployment line 153, and sixth ROV 161 may be coupled to surface vessel 5 via deployment line 163. In one embodiment as shown in FIG. 2A, ROVs 111, 121, and 131 are deployed on a first side of the vessel, and ROVs 141, 151, and 161 are deployed on a second side of the vessel. Basket 101 may also be coupled to surface vessel 5 via deployment line 103. More or less ROVs may be used. The TMS devices and separate ROV deployment line sections are not numbered in FIGS. 2A-2C for simplicity purposes, and in general the entire cable/deployment line from the ROV to the surface vessel is generically referred to as a deployment line, although it may include a separate tether segment and a separate umbilical cable segment. In this operation, the surface vessel may be travelling backwards with basket 101 towed behind the vessel such that the ROVs travel back and forth to basket 101 (in a staggered or "out of phase" sequence) to retrieve the seismic nodes. The illustrated grid spacing in FIG. 2A is approximately 100 meters. In one embodiment, each ROV may travel approximately 500 meters laterally from the surface vessel (with a corresponding 1000 meter tether). In other embodiments, the maximum lateral excursion may be 1000 meters or more from the surface vessel (such as with a 1500 meter tether). In other embodiments, draft coefficients on the tethers can be improved using well-known methods to increase the overall lateral excursions of the ROV. The TMS for each ROV is located a relatively small lateral distance from the surface vessel, as shown in FIG. 2A, and is positioned to avoid entanglement with the other ROVs. During travel from the basket to the intended seabed destination, the path of the ROV minimizes travel but also minimizes the change for entanglement with the adjacent ROV deployment lines. During travel back to the basket for node reloading, the ROV travels along the path of the deployment line to the TMS to minimize the change of wire entanglement. In one embodiment, the ROVs deploy all of the required seismic nodes for a particular seismic receiver line before travelling to the next receiver line. In other embodiments, each ROV travels in a substantially linear direction in the x coordinate (with the path of the surface vessel) so that four, six, or eight seismic nodes are placed about the same time (depending on the number of used ROVs) on a receiver line before traveling towards the next receiver line in the general path of the surface vessel heading.

FIGS. 2A-2C provide an example of the complexity of the catenary shapes of the deployment lines and the risk of entanglement. As shown in FIGS. 2A-2C, each deployment line has a catenary shape in the sea, a shape that may be modeled by a software system based on multiple variables as described herein. While the catenary shape of FIGS. 2A-2C is fairly simple for the purposes of this disclosure, in practice the complexity of the catenary shapes is much higher, particularly with complex seabed profiles and current profiles. As the ROVs operate and the surface vessel changes position and/or speed, the deployment lines have a greater chance of entanglement. Further, complicated subsea operations and increased efficiencies also increase the chance of entanglement of the deployment lines, thereby requiring greater precision of the ROVs which requires a greater knowledge of the catenary shape of the deployment lines and enhanced operation of the ROVs.

FIG. 2B shows the subsea system from FIG. 2A from a subsea side perspective. In this view only three of the ROV deployment lines (from one side of the vessel) are shown. In this embodiment, each ROV is substantially at the same position as each other from a longitudinal (x) and depth (z) position and they differ only in a lateral (y) position. For FIG. 2B, only ROV 111 and its cables/TMS is identified for simplicity purposes. Each ROV is connected to a corresponding TMS (such as TMS 115) via a cable (such as tether 113), and the TMS is likewise connected to the surface vessel via a cable (such as umbilical cable 117). Basket 101 is likewise coupled to the surface vessel via wire 103. As illustrated, each deployment line (whether the wire for the basket, the umbilical cable for the TMS, or the tether for the ROV) has a catenary shape, the position of which needs to be monitored to avoid entanglement of the cables/wires. In one embodiment, the surface vessel and ROVs are constantly moving to deploy seismic nodes and to avoid entanglement of the lines. The TMS units for each ROV are positioned a longitudinal distance x from basket 101 to avoid entanglement, which may be different for each TMS unit.

Likewise, FIG. 2C shows the subsea system from FIG. 2A from a subsea rear perspective. In this view, all six of the ROV deployment lines (three from each side of the vessel) are shown (only ROVs 111 and 151 and their corresponding TMS units 115, 155 are labeled for simplicity). In operation at any given time, the ROVs may be at different x, y, z positions during their movement between the cage and the intended seabed positions. In other words, FIGS. 2A-2C only illustrate one snapshot of one potential view of the placement of each of the ROVs during a sample operation.

FIG. 3 illustrates a top view schematic of one embodiment of the back deck of a marine surface vessel. Surface vessel 5 may have a left (port) and right (starboard) side, as well as a front (bow) and back (aft) side. In one operation, the surface vessel travels in a substantially astern direction (e.g., travels backwards). A backwards travel of the surface vessel allows a more desirable separation of the basket deployment lines from the ROV deployment lines based on the differential in hydrodynamic drag values and the effect of the different length of tether deployed. However, deployment vessels typically cannot travel backwards. For example, deployment vessels typically have their back (or aft) portion of the vessel open such that it is exposed to waves from the ocean. While forward movement of the ocean may not typically create waves on the back deck of the surface vessel, or at least waves significant enough to prevent deployment and/or seismic operations, a surface vessel traditionally cannot travel backwards as waves would come across the back deck of the vessel and prevent operations and cause increased safety risks. In other words, moving backwards or in a direction and/or maintaining a position in the flow of the tide creates significant safety concerns as the waves crash onto the back deck. This prevents most survey operations from moving backwards or in the face of incoming waves, which acts as an operational limitation to the survey. For the present disclosure, a wave blocker 301 may be located on the rear (or aft) end of the back deck of the marine vessel, as described in more detail in U.S. Patent Publication No. 2018/0052246, incorporated herein by reference. The wave blocker may comprise one or more steel gates or doors (e.g., a "wavegate") located at the aft portion of the vessel. In one embodiment, each door may be fixed in position, and in other embodiments, each of the doors may be rotated and/or moveable in a horizontal and/or vertical direction from a closed position to an open position. In another embodiment, the wavegate may comprise one or more movable or retractable transom bulwark sections that are sufficiently strengthened to withstand wave forces to the full height of the bulwark. In general, the wavegate provides a safer working deck environment no matter what heading is chosen for optimizing the operation.

FIG. 3 shows surface vessel 5 with two LARS basket systems 311, 313 that are each configured to raise and lower subsea equipment (such as basket 101). In one embodiment, seismic nodes may or may not be loaded on the basket. In one embodiment, the LARS basket system may be a conventional basket system as is known in the art. In one embodiment, only one LARS basket system is utilized. As is known in the art, autonomous seismic nodes are loaded into a basket (such as via skids, conveyors, trays, etc.) and the basket is lowered to a subsea position. FIG. 3 shows six ROV deployment systems 321, 322, 323, 324, 325, and 326 located on the surface vessel, with three being located on each side of the surface vessel, each of which is configured to lower a TMS unit with a coupled ROV as is known in the art. ROV deployment systems 321, 322, and 322 are located on the port side of the vessel and ROV deployment systems 324, 325, and 326 are located on the starboard side of the vessel. More or less ROV deployment systems may be used, such as between two and eight ROV deployment systems. As discussed above, with the backwards travel of the surface vessel, in one embodiment the LARS basket systems are located astern to the ROV deployment systems. The surface vessel may also have a control section/operation room(s) 303 where the ROVs are handled and overall system and operation of the vessel, deployment of ROVs, deployment of cage, and deployment of seismic nodes are monitored and controlled. The present disclosure does not depend on the particular type of ROV used, the subsea basket used, or the particular transfer/docking between the ROV and the subsea basket system. The back deck system 300 shown in FIG. 3 could similarly be used with untethered UUVs (as described later in reference to FIG. 5), such that a plurality of UUV deployment systems (each of which is configured to raise/lower a subsea docking station coupled to the UUV) can be located on the back deck as well as a plurality of LARS systems for any subsea baskets.

Modeling a Catenary Profile of the Deployment Lines

As described above, the present disclosure allows a surface vessel to operate a higher number of WROVs based in part on knowing and/or modeling the catenary shape of each ROV's deployment line (e.g., the tether and/or umbilical cable). Prior art Integrated Navigation Systems (INS) do not provide the ability to visualize the catenary shape of deployed lines (such as umbilicals, tethers, and basket wires) used in an offshore environment in real time, in particular deployment lines for ROVs for seismic operations. Further, existing INS systems do not predict in advance what a catenary problem may look like ahead of time and/or predictive modeling. The need for increased speed and efficiency for subsea operations requires a greater knowledge of the catenary shape of the deployment lines, particularly for some types or depths of subsea operations, and in particular for a high number of ROVs operating simultaneously. Based on the known positions of the deployment line and various other inputs (such as length of the deployment line, surface vessel operation conditions, current, etc.), a catenary shape of the deployment line can be modeled in real time or near real time. In some embodiments, a predictive model of the catenary shape of the deployment lines may be calculated or determined based on the anticipated position of the ROVs, cage, and surface vessel. The modeled catenary shape may also determine the tension of one or more points of the deployment line. In still other embodiments, real time sensors utilized may include but not be limited to USBL beacon positions, vessel gyroscopes, ROV gyroscopes, Doppler velocity logs (DVL), current profilers, echo sounders, and motion reference units (MRUs). In still other embodiments, the pre-survey data and/or seabed profile may be inputted into the modeling software for a better predictive analysis of the catenary shape.

In one embodiment, the disclosed system and method utilizes standalone time domain finite element (FE) software with a traditional INS to provide a navigation desk for the surface vessel and/or lowered equipment (e.g., ROV, UUV, TMS, subsea basket, etc.) with a real time view of the catenary shape of the deployed lines based on input from one or more real time navigation sensors, as described in more detail in PCT Application No. PCT/US2017/057582, incorporated herein by reference. In one embodiment, the real time sensors utilized may include but not be limited to USBL beacon positions, vessel gyroscopes, ROV gyroscopes, Doppler velocity logs (DVL), current profilers, echo sounders, and motion reference units (MRUs), as well as inputted parameters or values such as length of deployed cable, etc. In some embodiments sensors may be placed at various positions on the deployment line itself to provide additional guidance as to the position of the deployment line. In an additional embodiment, the disclosed system provides the capability to predict and/or model in advance what a catenary shape and/or problem will look like ahead of time based upon a variety of parameter values. In one embodiment the parameter values may be obtained from one or more of the real time sensors. In one embodiment, the software and predictive guidance system utilized may be similar to the modeling system for cable and node touch-down on the ocean bottom as described in more detail in Applicant's U.S. Pat. No. 9,891,333, incorporated herein by reference. In one embodiment, the disclosed method and system calculates the catenary shape of a plurality of deployment lines from the same surface vessel for a real time modeling and predictive modeling of the plurality of deployment lines. This allows the surface vessel and/or ROV operators to maximize the speed of the vessel and ROV within the operational constraints of the system without causing cable failure or entanglement.

Knowing the real time catenary shape of the deployment line (or plurality of deployment lines) provides many advantages. One commercial advantage is the ability to avoid letting out too much tether or cable to the lowered subsea equipment. Another advantage is to keep the tether management system (TMS) at the optimal depth. Still another advantage is for orientating the surface vessel heading (as well as control and operation of the subsea equipment connected to the deployment line) to give the best possible separation of the different subsea systems lowered from the surface vessel. The deployed line and deployed subsea equipment situation changes significantly depending on currents, tides, vessel speed/direction, vessel rate of turn, ROV speed/direction, seafloor terrain, subsea hazards, etc.

In one embodiment, results from the catenary modeling system can be provided to a Navigation Room on the surface vessel, which allows the operators of the ROV and/or surface vessel to know the real time and/or predictive modeling of the catenary shapes of the deployed lines. The Navigation Room is effectively the Command and Control system for the deployed equipment and surface vessel. By providing the simulation results to the Navigation Room and/or command station, the decision making of the ROV and/or surface vessels operations can be greatly improved. The operations can be optimized for maximum efficiency with greatest change of ROV entanglement with deployment lines.

In one embodiment, the disclosed system and method is configured to determine the catenary position of a plurality of deployment lines at the same time in the same general area (such as from the same surface vessel). Such a multi-catenary calculation is not disclosed in the prior art. In view of such calculations, the disclosed system is configured to determine the boundary conditions of the surface vessel (such as vessel speed, bearing, etc.) for optimal efficiency and speed of moving the subsea equipment for the particular subsea operation (such as the deployment of a plurality of seismic sensors). In another embodiment, the disclosed method models multiple elements of the deployment lines, such as real time and predicted catenary shape and cable tension, and in combination with subsea sensor inputs the catenary shapes are output into a navigation system on the marine surface vessel for real time visualization and analysis to more efficiently and quickly conduct the subsea operations, such as deploy a plurality of seismic sensors on the seabed by a plurality of ROVs.

Coupled Integrated Navigation System and ROV Dynamic Positioning System

As described above, the present disclosure allows a surface vessel to operate a higher number of WROVs based on the integration/cooperation of the surface vessel's integrated navigation system (INS) and each ROV's dynamic positioning (DP) system. Prior art ROV systems do not interface a surface vessel INS with the ROV control system/dynamic positioning (DP) system, thereby limiting the ability to automatically control the ROV during subsea operations.

The present disclosure allows for increased WROV operation in part by utilizing a direct data communications link between the surface vessel INS and the ROV controller/DP system. In one embodiment, the communications/data link is created using commercially available Ethernet hardware and a standard TCP/IP protocol to send messages of a defined format of the ROV and/or target coordinates in 2 dimensions (e.g., x, y) or 3 dimensions (e.g., x, y, z) such that the INS can provide the ROV DP system the coordinates of the next target position as selected by the INS operator. In some embodiment, the messages may include frequent updates (e.g., one update per second) on the ROV's calculated position to the ROV controller/DP system. Such messages from the INS provides the ROV enough information to allow its DP system to make the necessary commands to the ROV propulsion system to proceed to the target position according to parameters defined by the ROV operator or in the ROV's control software.

In one embodiment, the INS operator makes the selection of the target location. The target location could be either a preplot location or any fixed or dynamic waypoint defined by the INS, such as a seabed destination (e.g., the intended seismic node site), the position of another ROV, the ROV's Tether Management System (TMS), a winch hook, or a "basket" containing pallets of seafloor equipment lowered down from the vessel. With the target defined and being reported along with the current position of the ROV, the ROV operator/pilot can choose to engage this data stream as the reference for the ROV DP system. This allows the ROV operator to maintain more of a passive role, overseeing that the ROV is navigating safely and within limits, instead of requiring the pilot to manually steer the whole journey. This is commercially favorable in order to reduce pilot fatigue, increase operational efficiency, and/or allow the pilot to concentrate on other vehicles or tasks. Thus, the ROV can be maneuvered automatically, which allows the ROV to move faster and more accurately and decreases the amount of manpower needed to operate the ROV. Thus, the present disclosure provides a more efficient and cost effective way to move the ROV from a first position to a second position than hand steering alone. In some embodiments, some or all of the ROV tasks (such as docking with a subsea device, loading/unloading subsea payloads, planting and picking up seismic nodes from the seabed, etc.) can be automated for increased efficiencies.

In one embodiment, mission-planning software may be integrated with the real-time catenary modeling software for increased automation and/or control of the ROVs. For example, such a combination facilitates the return of the ROV to the basket and TMS by avoiding an ROV running into the tether of another ROV and predicting the most efficient/optimal heading, speed, and depth for the ROV. The optimal course may be maintained by the ROV's Dynamic Positioning system. Automated tether control is achieved by integrating the catenary modeling system (such as feedback from the catenary modeling system) to the corresponding TMS system (such as a TMS winch). Automated tether control helps maintain an optimal tether catenary, which results in improved ROV speed and less loading/movement by the ROV thrusters. In contrast, conventional tether control is a manual operation with the ROV pilot observing winch load and tether shape by a camera, which is inefficient and not practically possible for a large number of operating ROVs.

Operation

FIG. 4 illustrates one embodiment of a method 400 for deploying a plurality of remotely operated vehicles (ROVs), such as three or more ROVs, from a surface vessel for a subsea seismic deployment operation. A similar procedure can be performed for deploying untethered UUVs or ROVs. In one embodiment, the surface vessel is travelling backwards while the ROVs are deploying autonomous seismic nodes on the seabed, although forward movement of the surface vessel is also possible. Step 402 comprises deploying three or more ROVs from a surface vessel with a ROV deployment line connecting each ROV to the surface vessel, such as by the use of a tether management system with a separate tether and separate umbilical cable. In some embodiments, two, four, six, or eight ROVs may be simultaneously deployed and operated (as well as other ROV combinations). Step 404 comprises deploying one or more subsea baskets (such as a skid, tray, basket, etc.) from the surface vessel, wherein the basket is loaded with a plurality of autonomous seismic nodes. In other embodiments, the basket may be loaded with other subsea payloads besides ocean bottom seismic nodes. In still other embodiments, a separate vessel may deploy the one or more subsea baskets that is different than the vessel deploying the ROVs.

Step 406 comprises modeling a catenary shape of each of the ROV connecting/deployment lines. In some embodiments, the wire for the subsea basket may also be modeled. The modeling step can be performed before, during, and/or after the ROVs have docked to the subsea basket and transferred nodes from the subsea basket to the ROV. The modeling step may include measuring a plurality of positions of the deployment line connected the ROV to the surface vessel, as well as inputting a plurality of subsea conditions, such as current profile, seabed profile, etc. Data from other sensors may also be inputted, and other estimates as to cable tensions and other parameters may be used. The modeling can be a real time or near-real time modeling or predictive modeling of the catenary shape. In one embodiment, various operating parameters of the surface vessel and/or ROV may be inputted into the modeling software for increased accuracy of the catenary shape of the deployment lines. In some embodiments, the model may vary the surface vessel spread, heading, range, etc. to determine the optimal positioning of the ROV and/or surface vessel. In some embodiments, each of the ROVs may be positioned based on the modeled catenary shape of the deployment line, as shown in step 408.

Step 410 comprises positioning each of the ROVs based on commands from the ROV's dynamic positioning (DP) system, and may include not requiring an ROV operator to hand steer the ROV. As detailed above, this step may comprise inputting a target for the ROV to travel towards in a surface vessel INS. The target position may be automatically selected by the INS or may be inputted manually by an operator either by selecting a target with preset coordinates or by inputting particular x, y, z coordinates. In one embodiment, the ROV target position may be a preplot location or any fixed or dynamic waypoint defined by the INS, such as a particular seabed location (e.g., seismic node seabed position), the position of another ROV, the ROV's Tether Management System (TMS), a winch hook, or a "basket" containing pallets of seafloor equipment lowered down from the vessel, etc. This step may also comprise determining the ROV position in real time or near-real time. This step may also comprise having the surface vessel INS outputting the ROV target location and the ROV position to the ROV DP system, which may occur at regular time intervals. This positioning step may also comprise calculating the necessary ROV movement and/or action to move the ROV from the current ROV position to the target ROV position. The calculated ROV movement could be a single action or a series of actions intended to move the ROV from a first subsea position to a second subsea position, which may or may not be the final target ROV position. As appropriate, the ROV propulsion system (such as thrusters and a buoyancy control system) can be actuated as necessary to move the ROV towards the ROV target position based on commands from the DP system.

This process of monitoring and positioning is continually repeated during the duration of the ROV subsea operations. In other words, as long as the ROVs are operating at a subsea position(s), in one embodiment the catenary shapes of the deployment lines are modeled and the ROVs are automatically positioned based on guidance from the ROV DP system based on a direct communications/data link and input from the surface vessel INS.

Untethered Underwater Vehicles

FIG. 5 shows another embodiment of the present application. This embodiment may be similar to FIG. 1, but instead of using tethered ROVs or other underwater vehicles, the system 500 disclosed in FIG. 5 uses untethered ROVs or other unmanned underwater vehicles (UUVs). In this disclosure, an untethered UUV is meant to include but not be limited to an untethered ROV. By itself, an untethered ROV is not new. See, e.g., U.S. Pat. No. 9,505,473, incorporated herein by reference. An untethered ROV may be substantially similar to a tethered ROV (such as the FUGRO FCV3000 as one example), but relies on acoustic communications (or other wireless communications) to guide and control the ROV instead of communications via a tether and corresponding tether management system (TMS). Further, the untethered ROV/UUV has an independent power source, such as rechargeable batteries, so that a dedicated tether with a power line is not needed.

Tethers place significant constraints on the ROV, the ROV operators, and the entire system, particularly when multiple ROVs are used simultaneously. Tethers significantly increase the complexity of a subsea operation and lead to entangling of the lines between different ROV units. Using untethered ROVs or UUVs provides many benefits as opposed to tethered ROVs. In particular, untethered UUVs are advantageous when using multiple UUVs (such as between two and six and more UUVs) simultaneously for seabed operations, such as the placement of autonomous seismic nodes on the seabed. For example, untethered UUVs increase the efficiency of subsea operations by numerous mechanisms. The use of UUVs allows the surface vessel to change speed and course without impacting the UUV operations sub surface. For example, should one UUV become delayed, the remaining UUVs can continue without slowing down and the problematic UUV can catch up later or even be left on the seabed for a later recovery. In contrast, because a tethered UUV/ROV remains connected to the surface vessel, if a UUV/ROV becomes problematic (malfunction, battery life, unresponsive, etc.), then the surface vessel must stop operations to repair and/or recover the problematic unit. As another example, UUVs allow much longer excursions from the surface vessel in a horizontal direction. For example, typical underwater modems and acoustics used for communication and positioning allow a range of at least 3 km, as opposed to 500 meters to 1000 meters of lateral excursion for a typical tethered ROV. In addition, the use of untethered UUVs allows a faster surface vessel line change time, as the UUVs can move to the new line direction without concern of the surface vessel position or with risk of entanglement. In addition, untethered UUVs may operate without fear of the tether becoming tangled on the sea floor by any number of seabed (or subsea) hazards.

The UUV or ROV may be a specifically designed vehicle or may be an off the shelf vehicle with minor modifications, such as incorporating a skid or similar device to handle a plurality of subsea payloads (e.g., autonomous seismic nodes), a docking system to dock with a subsea basket, and a transfer system to move a seismic payload between the subsea basket and the underwater vehicle, which can all be integrated into a skid that can be then attached to a conventional untethered UUV or ROV. In general, a UUV is deployed in the water via a surface vessel by an umbilical connected to a docking station. In contrast to a tethered ROV, which is connected via a tether line to a TMS (with a tether winch inside) that is then connected to the surface vessel via an umbilical, the umbilical for a UUV is simply connected to a subsea docking station (e.g., a TMS without a tether winch or tether line). The subsea UUV docking station may allow the UUV to lock on and get charged or be recovered to the surface vessel deck by the corresponding umbilical and LARS system. In some embodiments in the event of a "dead" or unresponsive/malfunctioning UUV, the surface vessel may maneuver the docking system above the problematic AUV and dock it manually, and then recover the "dead" UUV to the surface vessel for repair. Still further, in one embodiment one UUV may assist and/or rescue another UUV by supplying power or towing to the problematic UUV to a subsea station or the surface vessel.

As shown in FIG. 5, surface vessel 5 may deploy a plurality of untethered unmanned underwater vehicles (UUVs) 511, 521, 531, 541 from surface 1 of a body of water to a subsea position, such as on or near seabed 3. One or more launch and recovery systems (LARS) may be located on the back deck of vessel 5, which is used to deploy and recover each of the UUVs and associated equipment. The untethered UUVs may include one or more untethered ROVs or untethered autonomous underwater vehicles (AUVs) or similar devices. As described above in relation to FIG. 1 and as generally known in the art for ROVs, in one embodiment, each UUV may include a robotic arm or other seismic node grabbing device, a skid or compartment configured to hold a plurality of autonomous seismic nodes, a docking mechanism configured to dock with a subsea device (such as basket 501), and a transfer mechanism configured to transfer autonomous seismic nodes between the subsea basket and the UUV. In one embodiment, the shape of an untethered UUV may be optimized for autonomous seismic node laying operations with a more streamlined form to reduce drag and therefore increase speed or reduce battery consumption as compared to a conventional tethered ROV or tethered UUV.

In one embodiment, the surface vessel deploys a first subsea docking system 561 via umbilical line 563 with an untethered UUV (such as UUV 511) coupled to the subsea docking system. Once the subsea docking station reaches a subsea position, the UUV may undock from the subsea station 561 and travel to the intended position. The subsea station 561 may stay subsea or be raised by a LARS system and equipped with an additional UUV. Thus, a single subsea station may be used to deploy and recover a plurality of UUVs at different times. In some embodiments, a single subsea station may be used to lower and raise a plurality of UUVs at the same time. In other embodiments, a plurality of subsea stations may be used to deploy a plurality of UUVs, such as subsea station 561 and subsea station 571, each with associated umbilical cables/lines 563, 573, respectively.

Subsea equipment (such as basket 501) may be lowered from surface vessel 5 via wire 503 at a subsea position on the seabed, near the seabed, or at some subsea position between the seabed and the surface as appropriate for the particular subsea operation. Subsea equipment 501 may be a cage, basket, skid or any other node transfer device capable of holding a plurality of autonomous seismic nodes 2 in a body of water and transferring those nodes to an external device, such as one or more of the plurality of UUVs. In one embodiment, for the particular time snapshot of the operations shown in FIG. 5, UUV 511 and UUV 521 are not holding any autonomous seismic nodes, while UUV 531 and UUV 541 are holding autonomous seismic nodes that need to be deployed to the seabed. In other words, during the simultaneous use of UUVs to deploy autonomous seismic nodes, some of the UUVs may be loaded with seismic nodes and other UUVs may be empty and need to be reloaded with additional seismic nodes.

As discussed above, rather than using a tether or similar wire for communications between the underwater vehicles and the surface vessel and/or TMS units, the underwater vehicles may communicate with surface vessel 5, with subsea stations 561, 571, and/or each other via wireless communications. Subsea wireless communications is well known in the art. For example, the following U.S. Patent Publication Nos. discuss subsea acoustic communications: 2016/0121983 and 2016/0046358, each of which is incorporated herein by reference. In one embodiment, surface vessel 5 may include an acoustic positioning system 505. Likewise, each subsea station 561, 571 may also include an acoustic device. Each of the UUVs may communicate with the surface vessel and/or subsea stations via an acoustic modem on the UUV (or similar device), thereby forming an acoustic system for the UUVs as is known in the art. All communications and guidance and control and similar operations for the plurality of UUVs may thus be provided via acoustic communications. In one embodiment, the UUVs are able to navigate and travel subsea with only infrequent direct communications from the surface vessel. For example, specific tasks, actions, and/or directions may be programmed or provided into the UUV mission and the UUV is able to execute the particular actions without constant communications with the surface vessel. In one embodiment, the UUV has an Inertial Navigation System, and combined with DVL and other instruments, that allows the UUV to follow a preset course and/or program. The particular mission can be updated when communications are re-established with the surface vessel. In one embodiment, the acoustic positioning system 505 and/or the each of the subsea stations 561, 671 may be coupled to the surface vessel's INS and/or UUV/ROV DP systems for control and/or positioning of the UUV. The acoustic positioning system 505 and/or the each of the subsea stations 561, 671 may also be used to determine the subsea position of the UUVs as is known in the art.

A wide range of acoustic communications may be used, as is known in the art. In one embodiment, the acoustic system may be an Ultra-Short Baseline (USBL) system, also sometimes known as Super Short Base Line (SSBL). This system uses a method of underwater acoustic positioning. A complete USBL system includes a transceiver or acoustic positioning system (such as device 505) mounted on a pole under a vessel or ROV (such as Hi-PAP, commercially available by Kongsberg) and a transponder on the UUV. It may also include acoustic devices located on TMS or subsea UUV docking stations. In general, a hydro-acoustic positioning system consists of both a transmitter (transducer) and a receiver (transponder). An acoustic positioning system uses any combination of communications principles for measurements and calculations, such as SSBL. In one embodiment, the acoustic positioning system transceiver 505 comprises a spherical transducer with hundreds of individual transducer elements. A signal (pulse) is sent from the transducer, and is aimed towards the seabed transponder (such as that located on the UUV). This pulse activates the transponder, which responds to the vessel transducer. The transducer detects this return pulse and, with corresponding electronics, calculates an accurate position of the transponder relative to the vessel based on the ranges and bearing measured by the transceiver. In one embodiment, to calculate a subsea position, the USBL system measures the horizontal and vertical angles together with the range to the transponder (located in the UUV) to calculate a 3D position projection of the UUV relative to the vessel or other subsea device. An error in the angle measurement causes the position error to be a function of the range to the transponder, so an USBL system has an accuracy error increasing with the range. Alternatively, a Short Base Line (SBL) system, an inverted short baseline (iSBL) system, or an inverted USBL (iUSBL) system may be used, the technology of which is known in the art. For example, in an iUSBL system, the transceiver is mounted on or inside the UUV while the transponder/responder is mounted on the surface vessel and the UUV has knowledge of its individual position rather than relying on such position from a surface vessel (as is the case in a typical USBL system). In another embodiment, a long baseline (LBL) acoustic positioning system may be used. In a LBL system, reference beacons or transponders are mounted on the seabed around a perimeter of a work site as reference points for navigation. The LBL system may use an USBL system to obtain precise locations of these seabed reference points. Thus, in one embodiment, the reference beacon may comprise both an USBL transponder and a LBL transceiver. The LBL system results in very high positioning accuracy and position stability that is independent of water depth, and each UUV can have its position further determined by the LBL system. The acoustic positioning system may also use an acoustic protocol that utilizes wideband Direct Sequence Spread Spectrum (DSSS) signals, which provides for a greater communications range in the water.

In one embodiment, a separate tethered ROV or UUV (not shown) may be used as a safety or emergency ROV. For example, if anything were to go wrong with the plurality of untethered UUVs (such as loss of acoustic communications), the separate tethered ROV could be deployed to recover the untethered UUV as appropriate. In one embodiment, the separate tethered ROV could be continuously deployed at a certain x, y, z position in the water away from the plurality of UUVs and subsea operations to help avoid wire entanglement. Thus, a single deployment operation may use a combination of tethered and untethered underwater vehicles.

Similar to the embodiments described above, the surface vessel may have one or more Dynamic Positioning (DP) systems that are used to automatically position the UUVs during subsea operations. The surface vessel may have a single DP system coupled to each of the UUVs or may have a plurality of DP systems, each coupled to a specific UUV. The DP system may be integrated and/or coupled to the surface vessel's INS. Even though the UUVs lack tethers, a catenary modeling system may still be used with untethered UUVs. For example, each of the subsea stations 561, 571 has an umbilical 563, 573 connected to the surface vessel and the basket 501 is connected to the surface vessel via wire 503. Thus, the UUV catenary modeling system may be used to dynamically model the position of the UUV umbilicals and the basket wire (in addition to the positions of the subsea stations and subsea basket) as discussed herein, as well as any separately tethered ROV.

In general, the mode of operation for using untethered ROVs or untethered UUVs is substantially similar to that of tethered ROVs as discussed herein, but offers significant advantages as discussed above. For example, similar to a tethered ROV operation as described above, the present disclosure simultaneously operates a large number of UUVs based on the use of and/or interaction of a number of separate innovations, including real time catenary modeling of the separate deployment lines (such as umbilical lines for each UUV's docking station and the wire for each of the subsea baskets), the integration between the surface vessel's Integrated Navigation Systems (INS) system and each UUV's dynamic positioning (DP) system, the ability for the surface vessel to travel backwards, and automated UUV operations, such as automated docking of the UUV to the subsea basket and automated UUV positioning from a first subsea position to a second subsea position without requiring an operator to physically steer the UUV. For example, the integrated surface vessel INS and DP system for each UUV allows for a high degree of automation of UUV subsea flight movements and tasks without needing an operator to physically steer the UUV.

In still other embodiments, the untethered UUVs may not include and/or be coupled to an umbilical at all. In other words, the UUV may have an independent power source (such as rechargeable batteries or other rechargeable power system) that does not need constant (or at least as frequent) recharging at a subsea station as is typically required for a conventional UUV. Further, any acoustic communications can be performed by the surface vessel to each of the UUVs without the need of a subsea docking station. This alternative embodiment would eliminate any subsea docking station (such as station 561) and corresponding umbilical cable (such as umbilical 563). Thus, the typical LARS system needed for ROVs and UUVs would not be necessary, as the deployment of a UUV without the associated docking system and umbilical could be performed by other mechanisms. For example, a ramp or rail system with conveyor belts or rollers could be attached on the side or back of a surface vessel, and the UUVs could be deployed and/or retrieved by the ramp or rail system and transferred to a respective onboard storage station for power recharging and/or storing.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the system are within the scope of the invention. For example, the surface vessel may travel forwards or backwards. The ROVs may be automatically positioned by the ROV DP system or actively steered by an ROV operator. Each of the ROV deployment lines may be continually monitored to determine the catenary shape of all of the deployment lines or such catenary shapes may be monitored for only some of the time while the ROV is in operation. Further, while one embodiment is directed to deployment of seabed seismic sensors, the operation of a high number of ROVs at the same time is applicable to a wide variety of subsea operations that are not limited to autonomous seismic nodes or even seismic applications. Still further, the ROV may be tethered or untethered, and in some embodiments any UUV may be used instead of an ROV. Still further, the UUV or ROV may not be coupled to an umbilical cable and can be deployed without a LARS system. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method for the deployment of ocean bottom seismic nodes, comprising:
   deploying a plurality of remotely operated vehicles (ROVs) from a surface vessel, wherein each of the ROVs is connected to the surface vessel by a ROV deployment line, wherein the plurality of ROVs comprises three or more ROVs, wherein each ROV deployment line comprises a catenary shape in the form of a curve, wherein each ROV comprises a Dynamic Positioning (DP) System;
   deploying a plurality of ocean bottom seismic nodes on the seabed by the three or more ROVs;
   modeling a catenary shape of each ROV deployment line during the deployment of the ocean bottom seismic nodes based on a plurality of subsea parameters, including cable length of the ROV deployment line and subsea position of the ROV;
   determining one or more operating parameters for each of the plurality of ROVs based on the modeled catenary shape of each ROV deployment line;
   using an Integrated Navigation System (INS) on the surface vessel to determine a subsea position of each ROV;
   outputting the modeled catenary shape of the ROV deployment line to the DP system;
   outputting the modeled catenary shape of the ROV deployment lines to the INS for real-time visualization of the ROV deployment lines;
   automatically positioning the plurality of ROVs during the deployment of the ocean bottom seismic nodes based on commands provided by the DP system based on the modeled catenary shape of each ROV deployment line and the output from the INS of the subsea position of the ROV; and
   determining one or more operating parameters for the surface vessel based on the modeled catenary shape of each ROV deployment line.

2. The method of claim 1, wherein the plurality of ROVs comprises six ROVs.

3. The method of claim 1, further comprising deploying the plurality of ROVs from the surface vessel while the surface vessel is travelling backwards.

4. The method of claim 3, wherein the speed of the surface vessel is approximately 2 knots.

5. The method of claim 1, further comprising determining a position of each of the ROVs by a surface vessel Integrated Navigation System (INS) and outputting that ROV position to the one or more DP systems.

6. The method of claim 1, further comprising
   deploying a subsea basket holding the plurality of ocean bottom seismic nodes from the surface vessel; and
   automatically docking each of the plurality of ROVs to the subsea basket based on commands provided by the one or more DP systems.

7. The method of claim 6, further comprising
   deploying the subsea basket astern to the deployment of the plurality of ROVs from the surface vessel.

* * * * *